US012668317B2

(12) United States Patent
Baeza

(10) Patent No.: US 12,668,317 B2
(45) Date of Patent: Jun. 30, 2026

(54) MODULAR SLIDING PLATFORM FOR A TRUCK BED

(71) Applicant: Hugo Baeza, Center Valley, PA (US)

(72) Inventor: Hugo Baeza, Center Valley, PA (US)

( * ) Notice: Subject to any disclaimer, the term of this patent is extended or adjusted under 35 U.S.C. 154(b) by 0 days.

(21) Appl. No.: 18/883,065

(22) Filed: Sep. 12, 2024

(65) Prior Publication Data

US 2025/0276742 A1 Sep. 4, 2025

Related U.S. Application Data

(60) Provisional application No. 63/559,408, filed on Feb. 29, 2024.

(51) Int. Cl.
| | |
|---|---|
| B60R 5/00 | (2006.01) |
| B60R 5/04 | (2006.01) |
| B62D 33/02 | (2006.01) |

(52) U.S. Cl.
CPC .......... B62D 33/0207 (2013.01); B60R 5/041 (2013.01); B62D 33/02 (2013.01)

(58) Field of Classification Search
CPC ..... B62D 33/0207; B62D 33/02; B60P 1/433; B60R 5/041
USPC .......... 296/26.08, 26.09, 26.11, 26.13, 37.6, 296/39.2; 414/522
See application file for complete search history.

(56) References Cited

U.S. PATENT DOCUMENTS

| | | | |
|---|---|---|---|
| 2,903,042 A | 9/1959 | Thornburg | |
| 3,820,821 A | 6/1974 | Leland | |
| 4,867,075 A | 9/1989 | Kukovich, Jr. | |
| 4,950,123 A * | 8/1990 | Brockhaus | B60P 1/00 |
| | | | 296/26.09 |
| 5,934,725 A * | 8/1999 | Bowers | B60P 3/40 |
| | | | 296/26.09 |
| 5,938,262 A | 8/1999 | Mills | |
| 6,082,806 A | 7/2000 | Bogard | |
| 6,390,525 B2 | 5/2002 | Carpenter et al. | |
| 6,464,274 B2 | 10/2002 | Mink et al. | |
| 6,491,331 B1 | 12/2002 | Fox | |
| 6,860,536 B1 | 3/2005 | Schimunek | |
| 7,416,234 B2 | 8/2008 | Bequette | |
| 8,020,911 B2 | 9/2011 | McKelvey | |
| 8,840,166 B1 | 9/2014 | Derbes et al. | |
| 10,464,492 B1 | 11/2019 | Linn et al. | |
| 10,668,870 B2 | 6/2020 | Furniss | |

(Continued)

*Primary Examiner* — Stephen T Gordon
(74) *Attorney, Agent, or Firm* — Dunlap Bennett & Ludwig PLLC

(57) ABSTRACT

A slidable truck bed platform provides an upper frame and a separate lower frame that operatively associate so that the upper frame is slidable relative to the lower frame between a retracted position and one of a plurality of extended positions. The lower frame connects to the truck bed. The upper frame provides a supporting platform that supports objects. In the retracted position, the upper and lower frames are in a vertical, stacked arrangement so that both frames can be circumscribed by the sidewalls and a closed tailgate of the truck. With the tailgate down the upper frame, its supporting platform, and all the objects supported thereon can be selectively moved to one or many extended positions, enabling the user to reach objects carried on the supporting panels. The slidable truck bed platform is dimensioned and adapted to be easily shipped to a user via less-than-truckload shipping containers.

4 Claims, 4 Drawing Sheets

(56)         References Cited

U.S. PATENT DOCUMENTS

| | | | |
|---|---|---|---|
| 10,829,059 | B1 | 11/2020 | Addison et al. |
| 11,124,247 | B2 * | 9/2021 | Sosnowich ........ B62D 33/0207 |
| 11,807,194 | B2 | 11/2023 | Potts |
| 2013/0341949 | A1 | 12/2013 | Bernthisel |
| 2016/0107560 | A1 * | 4/2016 | Thygesen .............. B62D 33/08 |
| | | | 296/37.6 |
| 2021/0300252 | A1 * | 9/2021 | Fusco .................... B60R 5/041 |
| 2023/0157451 | A1 | 5/2023 | Flagin et al. |

* cited by examiner

MODULAR SLIDING PLATFORM FOR A TRUCK BED

CROSS-REFERENCE TO RELATED APPLICATION

This application claims the benefit of priority of U.S. provisional application No. 63/559,408, filed 29 Feb. 2024, the contents of which are herein incorporated by reference.

BACKGROUND OF THE INVENTION

The present invention relates to structures for supporting goods in transit and, more particularly, a sliding truck bed platform for enabling easy access to contents stored in the truck bed.

Truck beds are invaluable in that they provide significant supporting surface for carrying objects the driver is interested in transporting. The depth of the truck bed, i.e., the length from the tailgate to the cab of the truck, however, can be too deep (or too long) so that an individual can have trouble accessing objects that are near the cab of the truck.

As can be seen, there is a need for a sliding truck bed platform for enabling easy access to contents stored in the truck bed by way a slidable platform on which the contents are supported, whereby the platform slides between a retracted position disposed within a footprint of the truck bed and one of a plurality of extended positions wherein at least a portion of the slidable platform extends beyond the footprint of the truck bed.

SUMMARY OF THE INVENTION

In one aspect of the present invention, a slidable platform for a storage space the slidable platform includes the following: an upper frame peripherally defining a platform; and a lower frame operatively associated with the upper frame so that the upper frame is movable between a retracted position and one of a plurality of extended positions, wherein the retracted position the upper frame and lower frame are both mutually inclusive of the storage space, and wherein any of the extended position the upper frame projects beyond the storage space, whereby the upper frame and the lower frame weight less than seventy pounds.

In another aspect of the present invention, the slidable platform further includes the following, wherein the storage space is a truck bed, wherein the platform comprises a plurality of panels, wherein the upper frame defines a periphery of the platform, wherein the lower frame directly connects to the storage space; and further including a front edge along the upper frame, wherein the front edge provides a locking handle; and a locking bar operatively associated with the locking handle so that the upper frame is movable between an unlocked engagement and a locked engagement in more than one of the extended positions of the plurality of extended positions.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, an embodiment of the present invention provides a slidable truck bed platform for enabling easy access to contents stored along the truck bed. The slidable truck bed platform provides an upper frame and a separate lower frame that operatively associate so that the upper frame is slidable relative to the lower frame between a retracted position and one of a plurality of extended positions. The lower frame connects to the truck bed. The upper frame provides a panel or panels that define a supporting platform that can support objects. In the retracted position, the upper and lower frames are in a vertical, stacked arrangement so that both frames can be circumscribed by the sidewalls and closed tailgate of the truck, or in other words the upper frame and the lower frame are both mutually inclusive of the footprint of the truck bed. With the tailgate down, the upper frame and its supporting platform can be moved to an extended position that facilitates a user in reaching objects carried on the supporting platform. The slidable truck bed platform is dimensioned and adapted to be easily shipped to a user via common delivery means and also making it easier for the user to install the slidable truck bed platform in their vehicle after it is delivered.

Figures 1, 2:
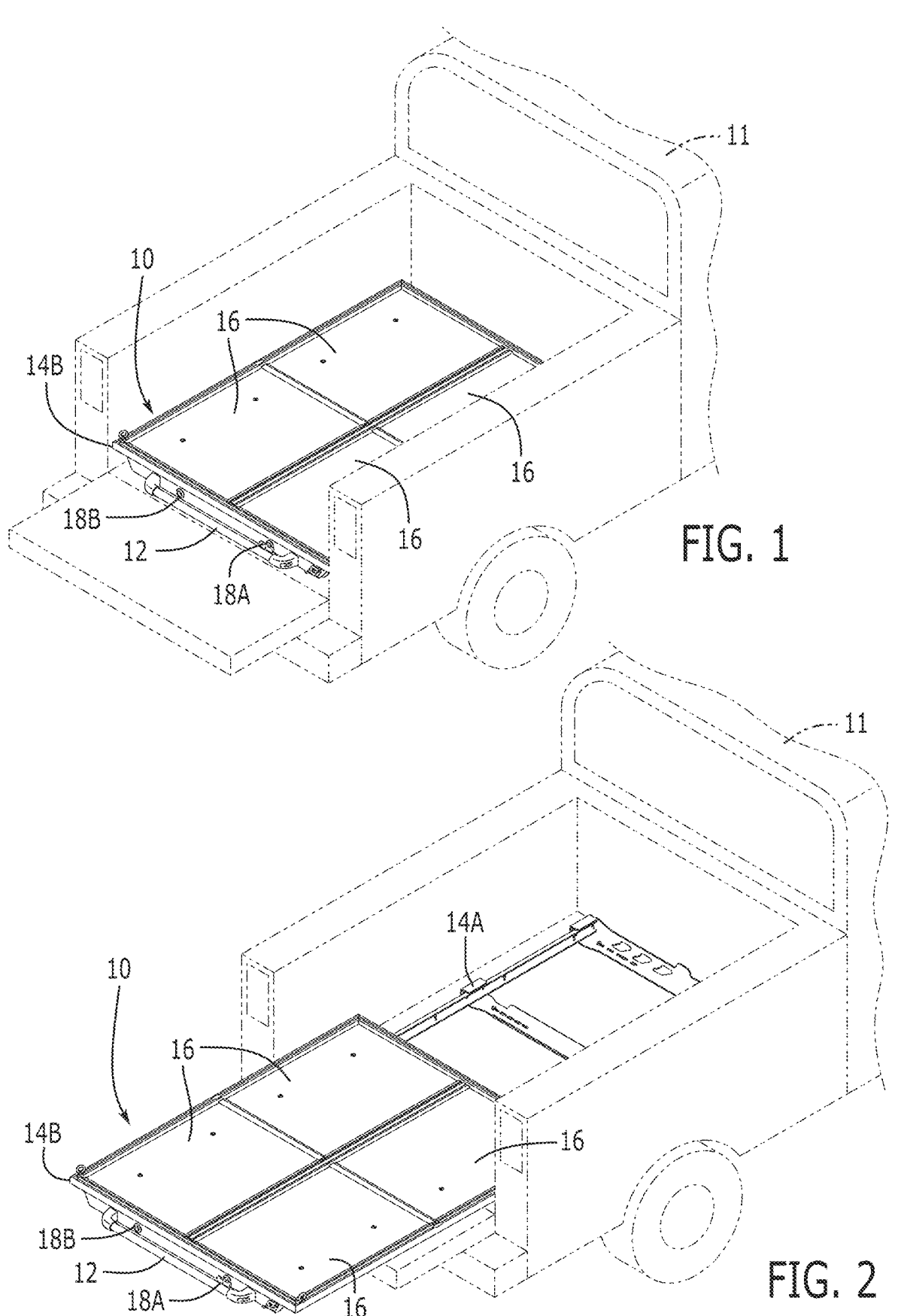
FIG. 1 is a top perspective view of an exemplary embodiment of the present invention, shown in use in a retracted position, wherein a footprint of the upper frame 14B and a footprint of the truck bed are mutually inclusive.
FIG. 2 is a top perspective view of an exemplary embodiment of the present invention, shown in use in one of a plurality of extended positions, wherein a portion of the upper frame 14B is beyond the footprint of the truck bed.
Figure 3:
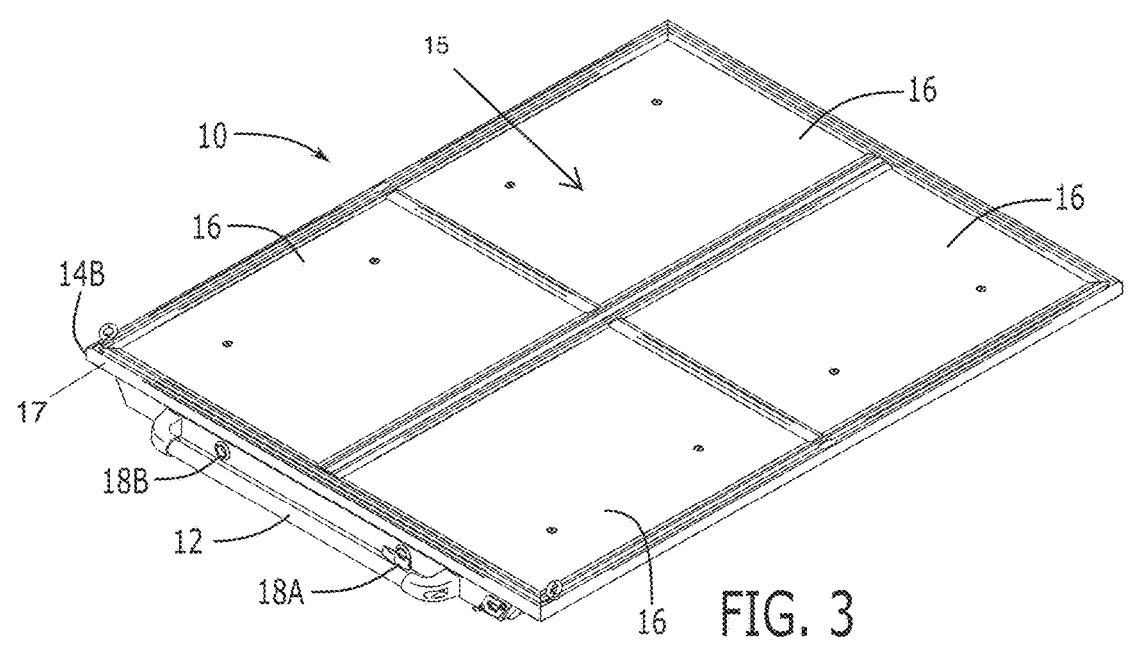
FIG. 3 is a top perspective view of an exemplary embodiment of the present invention.
Figure 4:
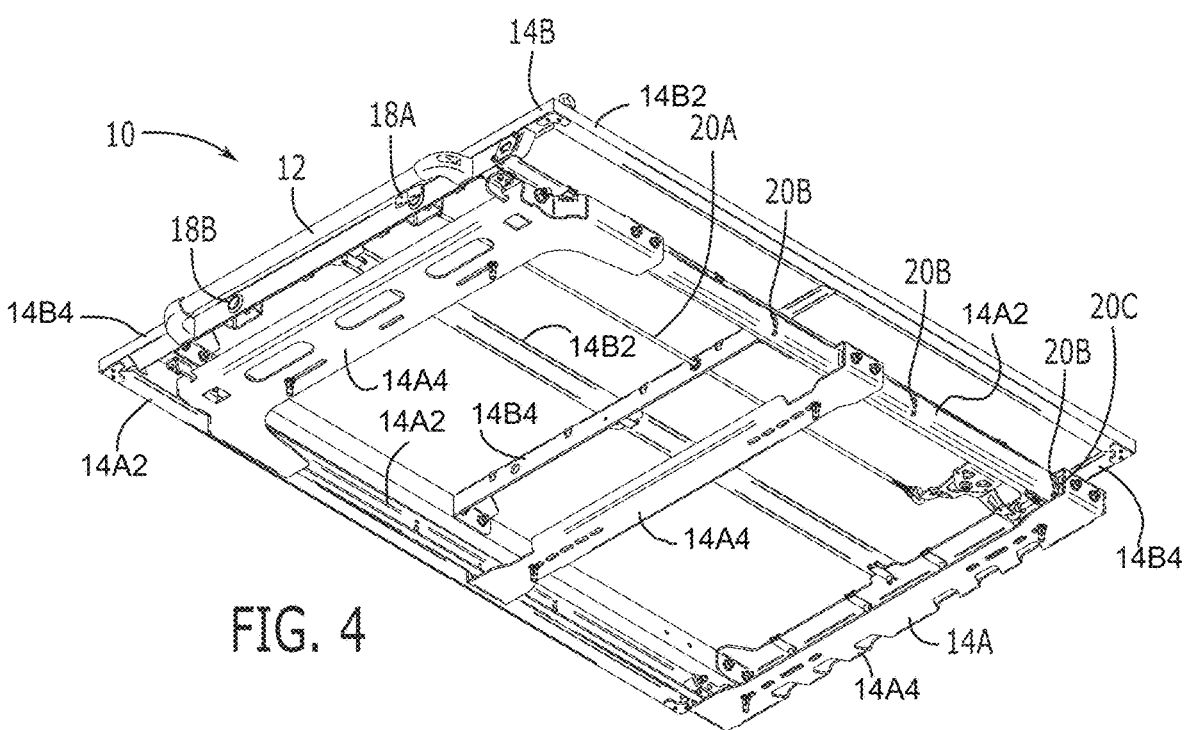
FIG. 4 is a bottom perspective view of an exemplary embodiment of the present invention, detailing the components of an underlying framework thereof. The upper frame 14B is shown having three longitudinal members 14B2 and three lateral members 14B4, while the lower frame 14A is shown having two longitudinal members 14A2 and three lateral members 14A4.
Figure 5:
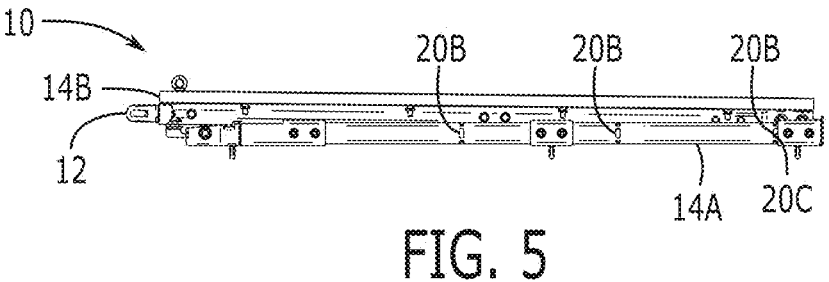
FIG. 5 is a side elevation view of an exemplary embodiment of the present invention, shown in the retracted position.
Figure 6:
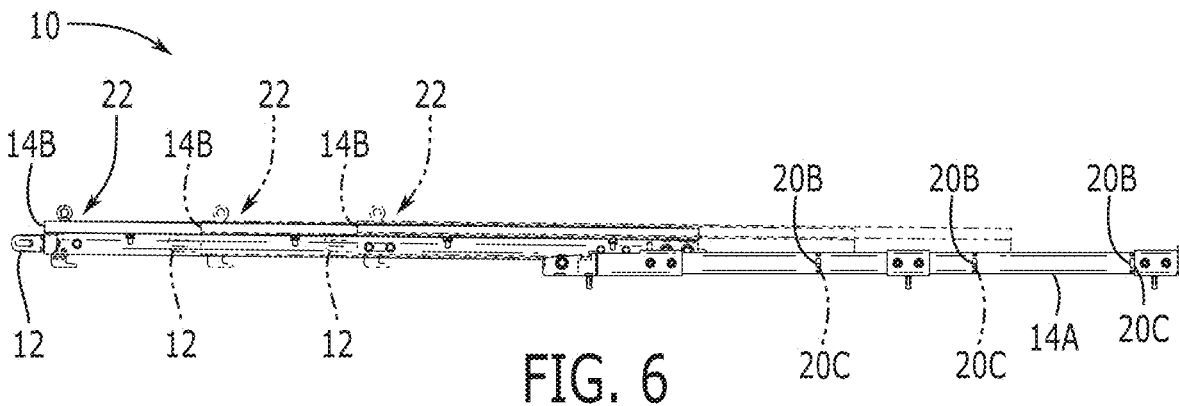
FIG. 6 is a side elevation view of an exemplary embodiment of the present invention, shown in one extended position of the pluralities of extended positions to illustrate a lockable extension of the present invention, wherein the lockable extension prevents the slidable platform from shifting while the vehicle is in motion.
Figure 7:
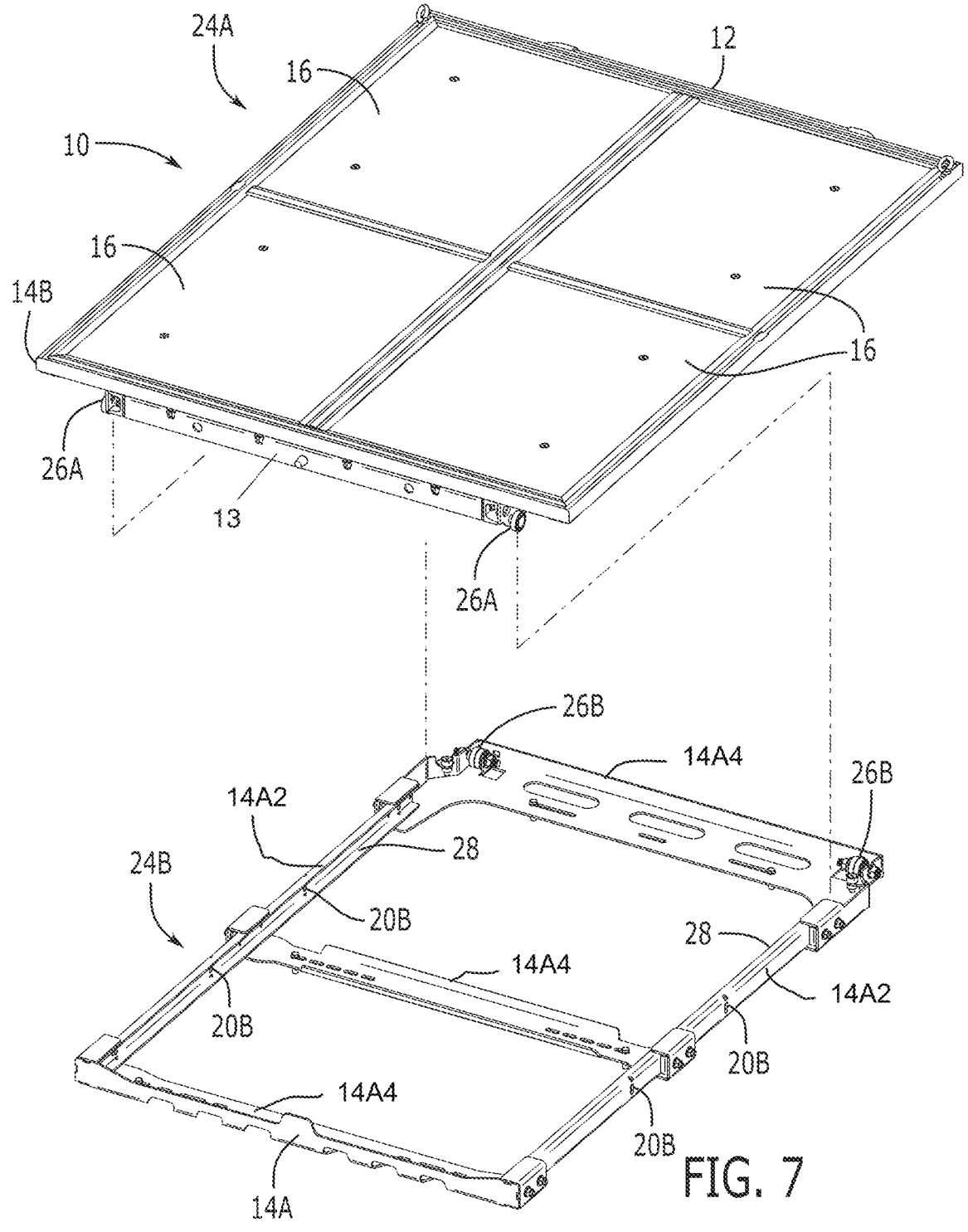
FIG. 7 is an exploded perspective view of an exemplary embodiment of the present invention, illustrating the operative association between an upper frame 14B and a lower frame 14A.

Referring to FIGS. 1 through 7, the present invention may include a slidable vehicular platform 10 dimensioned and shaped for a truck bed or an equivalently circumscribed supporting surface of a vehicle 11 or even a storage unit. The slidable vehicular platform 10 provides a supporting platform 15, peripherally defined by an upper frame 14B. The upper frame 14B supports one or more panels 16 which form the supporting platform 15.

A lower frame 14A that operatively associates with the upper frame 14B so that the upper frame 14B, and by extension the supporting platform 15, is moveable between one of a plurality of extended positions and a retracted position fully circumscribable by the sidewalls and a closed tailgate of the vehicle 11 in a nested or mutually inclusive condition.

The upper frame 14B may provide a supporting element 13 having two upper assembly bearings 26A: one upper assembly bearing 26A at each end of the two opposing ends of the supporting element 13. The lower frame 14A may provide opposing longitudinal slide tracks 28 through which the upper assembly bearings 26A can slidably engage and ride along to move between the extended positions and the retracted position. The lower frame 14A may provide lower assembly bearings 26B dimensioned and adapted to work with the upper assembly bearings 26A to facilitate the slidable engagement of the latter with the longitudinal slide tracks 28. The upper assembly bearings 26A may be side load bearings and the lower assembly bearings 26B may be free floating. The lower assembly bearings 26B can be mounted on a cradle, thereby providing more strength and smoother action.

A front edge 17 of the upper frame 14B may provide a handle 12 to facilitate a user's manipulation and moving of the upper frame 14B between the extended and retracted positions. The front edge 17 of the upper frame 14B may also provide an unlocking handle 18A or 18B, the placement of which is merely a matter of personal preference or on the handiness of a user. A locking bar 20A may extend from the unlocking handle 18A so that upon a user activating the unlocking handle 18A the upper frame 14B is movable between a locked engagement and an unlocked engagement. In some embodiments the unlocking handle 18A is the handle that a user pulls to move the locking bar 20A to the unlocked engagement position, unlocking the slidable platform/upper frame 14B. in other words, the unlocking handle 18A is an extension that pulls on the locking mechanism of the locking bar 20A.

The lower frame 14A may have a plurality of locking pin slots 20B so that an operative end 20C of the locking bar 20A can selectively form a locking engagement at one or several points along the lower frame 14A—i.e., at points where a locking pin slot 20B is provided—thereby the supporting platform 15 can be locked at many different extended positions relative to the lower frame 14A. The operative end 20C may be a locking pin or other structure that can form a locking engagement with a locking pin slot 20B.

The supporting platform 15 and/or the upper frame 14B may provide one or more lockable extension locations 22 through which a user can lock the upper frame 14B along a plurality of points, meaning there is a plurality of stops until the upper frame 14B is fully extended.

Less-than-truckload shipping or less than load (LTL) is the transportation of an amount of freight sized between individual parcels and full truckloads. Parcel carriers handle small packages and freight that can be broken down into a unit that weighs at least 150 pounds (68 kg). Full truckload carriers move via semi-trailers.

In contrast to LTL shipping, UPS™ or FedEx™, is more cost effective and reliable, though it only transports parcels that are no more than 150 pounds each. Thus, non-LTL shipping is a cost-effective way of receiving goods that are less than 150 pounds. Critically, the upper frame 14B is dimensioned, shaped, and adapted to occupy a first volume 24A that can fit in a first parcel or container, whereby the first parcel weighs less than 150 pounds. Likewise, the lower frame 14A is dimensioned, shaped and adapted to weigh less than 150 pounds and occupies a second volume 24B, which can fit in a second parcel or container.

Therefore, the slidable vehicular platform 10 can be delivered to a user in two non-LTL parcels/containers—whereby each parcel/container weighs a maximum of 75 pounds. This critical weight limitation is enabled by the slidable vehicular platform 10 utilizing aerospace aluminum, steel and composite materials to make the platform lightweight yet durable. These design features are also what allow non-LTL shippers (e.g., UPS™ or FedEx™ drivers) to lift the first and second parcels/containers and deliver them to a residential neighborhood. This is what makes the slidable vehicular platform 10 "modular"—as the slidable vehicular platform 10 can be shipped in two separate non-LTL containers.

In sum, the slidable vehicular platform 10 is modular and ships via non-LTL shippers, while prior art sliders are not modular and cannot ship via UPS™ or FedEx™, because they embody large pallets. The cost of LTL is four times higher than UPS™ or FedEx™. Furthermore, once received via an LTL shipper a user of prior art devices would need three to four people to lift prior art sliders, which generally weigh about 400 pounds if you include the LTL pallet required to support such sliders. Additionally, most consumers do not have the resources to accept an LTL shipment.

Another property of the slidable vehicular platform 10 is that it can be assembled with simple hand tools as several key features and components improve the design making it stronger and easier to transport.

Once the slidable vehicular platform 10 is assembled and installed on the back of a vehicle 11, the slidable vehicular platform 10 makes getting contents in and out of the vehicle 11 much easier. Thereby, the slidable vehicular platform 10 will help people and prevent injuries when trying to get a heavy object out of the back of the vehicle 11.

The slidable vehicular platform 10 was designed with the idea that the product can be used in different fields. Thus, the present invention contemplates attachments that can be used in the construction or maintenance industries, including attachments for outdoor activities such as camping, hunting, cycling, and fishing.

A method of assembling the present may include the following. The slidable vehicular platform 10 will arrive in two distinct non-LTL parcels. The first non-LTL parcel will include the lower frame 14A that makes up the bottom section of the slidable vehicular platform 10. There are three frame sections placed in a horizontal position. There are four sections placed in a vertical position. Once assembled and joined together they form the lower frame 14A. The second non-LTL parcel contains the upper frame 14B and composite supporting platform 15. Once the upper frame 14B is assembled in the same manner that the lower frame 14B was assembled the top panels 16 are installed. Finally, the two frames 14A and 14B are joined together by sliding the upper frame 14B bearing section into the lower channel section. Once the top section is in place, the bearings glide the upper frame 14B in and out. The upper frame 14B can be stopped at several points by using the handle at the front of the slide. The upper and lower portions/frames of the slidable vehicular platform 10 stow away inside the rear bed of the truck or van in the retracted position.

The slidable vehicular platform 10 may have two lateral side bearings that keep the framework in place if the vehicle 11 is at an angle or on a hill. By adding the two extra bearings the slidable vehicular platform 10 can be loaded and unloaded on uneven terrain.

The slidable vehicular platform 10 is made up of several parts that can be interchanged to make the slide longer or shorter. The slidable vehicular platform 10 may have horizontal sections and can be used with different length vertical sections to fit different truck bed length and sizes. Since the slidable vehicular platform 10 is modular and not a one-piece welded design the slidable vehicular platform 10 can be used in different vehicles of different sizes. Having a modular base and top allows the slidable vehicular platform 10 to maintain lower inventory levels and assemble the unit based on the order or customers truck size. The slidable vehicular platform 10 will be kept in components that will be paired to make up the desired truck bed length. Competitors cannot do this since their units are welded.

As used in this application, the term "about" or "approximately" refers to a range of values within plus or minus 10% of the specified number. And the term "substantially" refers to up to 80% or more of an entirety. Recitation of ranges of values herein are not intended to be limiting, referring instead individually to any and all values falling within the range, unless otherwise indicated, and each separate value within such a range is incorporated into the specification as if it were individually recited herein.

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. For the purposes of this disclosure, the term "above" generally means superjacent, substantially superjacent, or higher than another object although not directly overlying the object. Further, for purposes of this disclosure, the term "mechanical communication" generally refers to components being in direct physical contact with each other or being in indirect physical contact with each other where movement of one component affect the position of the other.

The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down,"

and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. A slidable platform for a truck bed, the slidable platform comprising:

an upper frame peripherally defining a platform, wherein a frame footprint of the upper frame is dimensioned to be circumscribed by a bed footprint of the truck bed while occupying a substantial portion of the bed footprint; and a lower frame operatively associated with the upper frame so that the upper frame is movable between a retracted position and one of a plurality of extended positions, wherein in the retracted position the upper frame and lower frame are both circumscribed by the bed footprint, and wherein in any of the extended positions the upper frame projects beyond the bed footprint;

a front edge along the upper frame, wherein the front edge provides a locking handle;

a locking bar operatively associated with the locking handle so that the upper frame is movable between an unlocked engagement and a locked engagement in more than one of the extended positions of the plurality of extended positions;

the upper frame comprises a rear member, wherein the rear member comprises a supporting element;

two side load bearings, one of the two side load bearings disposed at each of two opposing ends, respectively, of the support element;

two sliding tracks provided on two longitudinal members of the lower frame, respectively, wherein each of the two sliding tracks is configured to slidably receive a respective side load bearing; and two free floating bearings along the lower frame to work with the two side load bearings to facilitate the upper and lower frames movable operative association.

2. The slidable platform of claim 1, wherein the upper frame platform comprises a plurality of panels based on the depth of the truck bed.

3. The slidable platform of claim 1, wherein the upper frame defines a periphery of the platform.

4. The slidable platform of claim 1, wherein the lower frame directly connects to the truck bed.

* * * * *